(12) United States Patent
Bonsteel et al.

(10) Patent No.: US 7,584,459 B2
(45) Date of Patent: Sep. 1, 2009

(54) METHOD FOR PROVIDING COMPUTING-ENVIRONMENT CONTROL OF A RESOURCE TO BE ACCESSED BY PROGRAM CODE

(75) Inventors: Roger E. Bonsteel, Kingston, NY (US); Juilet C. Candee, Brewster, NY (US); John L. Czukkermann, Lagrangeville, NY (US); David B. Emmes, Wappingers Falls, NY (US); Steven J. Greenspan, Poughkeepsie, NY (US); Joshua W. Knight, Mohegan Lake, NY (US); Alan M. Webb, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 11/035,616

(22) Filed: Jan. 14, 2005

(65) Prior Publication Data
US 2006/0161905 A1 Jul. 20, 2006

(51) Int. Cl.
*G06F 9/45* (2006.01)
(52) U.S. Cl. ..................................................... 717/136
(58) Field of Classification Search .......... 717/136–140
See application file for complete search history.

(56) References Cited

U.S. PATENT DOCUMENTS

| 6,128,590 | A | 10/2000 | Stadel et al. ................. 703/27 |
| 6,226,734 | B1 * | 5/2001 | Kleinsorge et al. ............ 712/13 |
| 6,260,068 | B1 | 7/2001 | Zalewski et al. ............ 709/226 |
| 6,542,926 | B2 | 4/2003 | Zalewski et al. ............ 709/213 |
| 6,698,017 | B1 * | 2/2004 | Adamovits et al. .......... 717/168 |
| 7,082,598 | B1 * | 7/2006 | Le et al. ..................... 717/127 |
| 2004/0068715 | A1 * | 4/2004 | Wong et al. ................. 717/136 |

OTHER PUBLICATIONS

"An Architectural Framework For Migration From CICS To Higher Performance Platforms," Gabriel M. Silberman and Kemal Ebcioglu; 1992 ACM 0-89791-485-6/92/0007/0198, pp. 198-215.
"Native Code Process-Originated Migration In A Heterogeneous Environment," Charles M. Shub; 1990 ACM 089791-348-5/90/0002/0266, pp. 266-270.
"Threaded Multiple Path Execution," Steven Wallace, Brad Calder, Dean M. Tullsen; 12 pages.

* cited by examiner

*Primary Examiner*—Wei Y Zhen
*Assistant Examiner*—Junchun Wu
(74) *Attorney, Agent, or Firm*—William A. Kinnaman, Esq.; Kevin P. Radigan, Esq.; Heslin Rothenberg Farley & Mesiti P.C.

(57) ABSTRACT

A method of facilitating computing-environment control of a resource to be accessed by existing program code is provided which includes transparently replacing an uncontrolled resource referenced by existing program code with a resource controlled by a computing environment. The method also includes transparently interposing at least one resource management service of the computing environment between the existing program code and the resource controlled by the computing environment, wherein the at least one resource management service provides computing-environment control of the resource to be accessed by the existing program code. The replacing of the uncontrolled resource prevents the existing program code from directly accessing the resource.

7 Claims, 4 Drawing Sheets

METHOD FOR PROVIDING COMPUTING-ENVIRONMENT CONTROL OF A RESOURCE TO BE ACCESSED BY PROGRAM CODE

TECHNICAL FIELD

This invention relates in general to migrating program code from one computing environment to another, and more particularly, to a technique for transparently providing computing-environment control of a resource to be accessed by existing program code.

BACKGROUND OF THE INVENTION

It is often desirable to migrate program code from one computing environment to another to provide analogous functionality in different computing environments. One of the goals of such a migration is to reduce program-code development costs by sharing a single instance of program source code (for example, a device driver) across a number of computing environments or platforms. Therefore, it is advantageous to not change the shared program source code simply to accommodate platform differences. One problem that arises is that various operating systems for computing environments use different approaches for managing resources of a computing environment.

For example, in a UNIX device driver, the memory used to represent a lock is typically placed directly in the control blocks of the resource that the lock is being used to control. As a result, this memory is uncontrollably accessible to and changeable by any program in the computing environment which has access to the enclosing control block. While this is normal practice in the UNIX environment, other computing environments exist which do not directly expose resources of the computing environment to programs executing in the operating environment. Therefore, there is a need in the art for a technique of migrating existing program code from a native computing environment to a target computing environment that addresses the problem of the different placement of computing-environment resources while maintaining a single instance of an existing program's source code.

SUMMARY OF THE INVENTION

In one aspect, the shortcomings of the prior art are overcome and additional advantages are provided through the provision of a method of providing computing-environment control of a resource to be accessed by existing program code. The method comprises transparently replacing an uncontrolled resource to be accessed by existing program code with a resource controlled by a computing environment. The method also comprises transparently interposing at least one resource management service of the computing environment between the existing program code and the resource controlled by the computing environment, wherein the at least one resource management service provides computing-environment control of the resource.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

The present invention provides a facility for computing-environment control of a resource which is exposed to existing program code; i.e., the resource is within the memory space accessible by the existing program code. Providing computing environment control of a resource is advantageous where, for example, the exposed resource (i.e., uncontrolled resource) is critical to the reliability, availability, or serviceability of the computing environment. A file lock is one example of such a critical resource. In accordance with an aspect of the present invention, an exposed (uncontrolled) resource is replaced with an opaque handle, which represents the exposed resource. The handle cannot be meaningfully manipulated by the existing program code, which has access to a control block in memory in which the handle is stored. Services which intentionally operate on the resource in question (for example, a file lock) are redefined over appropriate computing environment services which then interpret the handle stored in the exposed control block.

This technique prevents inadvertent modification of the resource which has been replaced by a handle and ensures that appropriate locally-defined mechanisms of the target computing environment are employed when the existing program utilizes this resource. The locally-defined mechanisms of the target computing environment facilitate the reliability, availability, and serviceability of the target computing environment in one exemplary embodiment of the invention.

Methods of providing computing-environment control of a resource to be accessed by existing program code, in accordance with the present invention, may be incorporated in and used with many computing environments. One example of a computing environment incorporating and using a method of providing computing-environment control of a resource to be accessed by existing program code, in accordance with the present invention, is illustrated in FIG. 1 and described in detail below.

Figure 1:
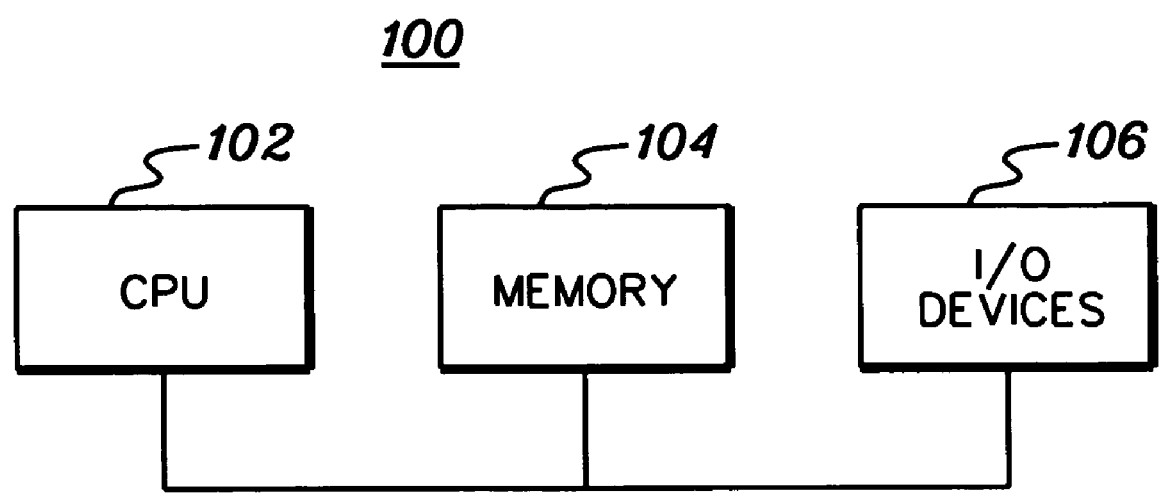
FIG. 1 illustrates one example of a computing environment incorporating and using a method of facilitating computing-environment control of a resource to be accessed by existing program code, in accordance with an aspect of the present invention.

Referring to FIG. 1, computing environment 100 includes, for instance, central processing unit (CPU) 102, memory 104, and one or more input/output devices 106, each of which is described below.

As is known, central processing unit (CPU) 102 is the controlling center of computing environment 100 and provides the sequencing and processing facilities for instruction execution, interruption action, timing functions, initial program loading and other machine related functions. The central processing unit executes at least one operating system, which is used to control the operation of the computing environment by controlling the execution of other programs, controlling communication with peripheral devices and controlling use of the computer resources.

Central processing unit 102 is coupled to memory 104, which is directly accessible and provides for high-speed processing of data by the central processing unit. Memory 104 is also coupled to one or more input/output devices 106. These devices include, for instance, keyboards, communications controllers, teleprocessing devices, printers, magnetic storage media (e.g., tapes, disks), direct access storage devices, and sensor based equipment. Data is transferred from memory 104 to one or more input/output devices 106 and from the input/output devices to the memory.

In one example, computing environment 100 includes a zSeries® main frame server running a z/VM® or z/OS® operating system, which are all offered by International Business Machines Corporation. (The marks zSeries, z/VM, and z/OS are registered trademarks of International Business Machines Corporation.) The invention is not limited to such environments, however. The technique and capabilities of the present invention can be incorporated in and used with many types of computing environments and with many types of computer systems or platforms. The above system is only offered as an example.

It is sometimes desirable that a program's source code be shared across two or more heterogeneous platforms. Such sharing implies that the program's source files must be usable as-is in each of the computing environments. In one example, a program to be shared across heterogeneous platforms consists of one or more program source files, which contain the program definitions and statements that collectively represent the shared functionality, and one or more program include files which contain definitions and declarations for resources that are not part of the program's unique functional definition, but which are referenced by the program. The program code of the program source files may also contain program include files which are related to the program's unique functionality, but the program include files related to the program's unique functionality are not essential to the present invention.

Although the C programming language is used in one embodiment of the present invention, the method of present invention is applicable to many programming languages. The preprocessor capabilities of the C programming language employed can also be provided by any of the numerous stream-based editing tools that are available. One example of a stream-based editing tool which provides the needed functionality is m4.

The management of shared resources in a computing environment can be facilitated by concealing the actual implementation of a resource from a program. Any of a number of established techniques to conceal the actual implementation of a resource may be used. In accordance with an aspect of the present invention, the program to be shared conceals the actual implementation of a resource to be controlled or managed by the computing environment. In one embodiment, for example, the resource is declared and defined using a resource-related program include file, and all operations over that resource are performed via data types, macros and functions declared by that program resource include file.

As used herein, the term native designates the operating system and computing environment for which a shared program was originally written. Also, the term target, as used herein, refers to an operating system or computing environment which is intended to share one or more program source files already existing on the native system. As will be appreciated by one with ordinary skill in the art, the method of the present invention can be utilized also in new program code which is expressly written to be shared across heterogeneous computing environments.

Example 1 hereinbelow is an example of program source code which is to be shared across a plurality of heterogeneous platforms. Example 1 illustrates features of program source code which are utilized in one embodiment of the present invention. In the program source code of Example 1, the nature of a resource to be isolated from the existing program code is concealed by an explicitly-declared data type in a program resource include file named lock.h. In line 4 of Example 1, an array named "lock" is declared to be a data type "lock_t," an explicitly-declared data type. Example 2 hereinbelow is an example of the lock.h program resource include file for a native computing environment of the program source code of Example 1. In line 4 of Example 2, data type lock_t is declared to be a long integer. In Example 1, therefore, the nature of the array named "lock" is concealed by the explicitly-declared data type "lock_t." Concealing the data type of a resource in this way, for example, facilitates identifying instances of the resource by automated pre-compilation source code rewriting mechanisms.

Also, all operations over the resource lock[0] in Example 1 are performed by functions provided by program resource include file lock.h. That is, functions initlock( ), deletelock( ), lock( ), and unlock( ) invoked in lines 10, 16, 21, and 32 of Example 1, respectively, are declared in the lock.h of Example 2. (The actual argument "common.lock" provided in these function calls is the first member of the data structure named "common", which is the initial element of the "lock" array.)

```
1    #include <lock.h>
2
3    struct xyz {
4            lock_t lock[0];
5            int other;
6    } common;
7    void proginit ( )
8    {
9            ...
10           initlock (common.lock);
11           ...
12   }
13   void progterm ( )
14   {
15           ...
16           deletelock (common.lock);
17           ...
18   }
19   void progfunc1 ( )
20   {
21           lock (common.lock);
22           ...
23           unlock (common.lock);
24   }
```

EXAMPLE 1

Source Code File of Program Code Written in the C Programming Language

```
1  #ifndef lock__h
2  #define lock__h
3
4  typedef long int lock__t;
5
6  int initlock (lock__t * lock);
7  int lock (lock__t * lock);
8  int unlock (lock__t * lock);
9  int testlock (lock__t * lock);
10 int deletelock (lock__t * lock);
11
12 #endif
```

EXAMPLE 2 lock.h Program Resource Include File for a Native Computing Environment of the Program Source Code of Example 1

Since line 1 of the program source code of Example 1 includes the program resource file lock.h, the existing program code for the native computing environment comprises the program source code of Example 1 and the program resource include file lock.h of Example 2.

By replacing the lock.h program resource include file of the native computing environment (Example 2) with a lock.h program resource include file of a target computing environment (Example 3, hereinbelow), the existing program code can be rewritten transparently to provide computing-environment control of a critical resource to be accessed by the program source code of existing program code.

```
1  #ifndef lock__h
2  #define lock__h
3
4  #include <handle.h>
5  #include <syslock.h>
6
7  typedef handle__ct lock__t;
8
9  #define initlock(__lock__) \
10    ( { \
11      syslock__t syslock; \
12      syslock = sys__initlock ( ); \
13      h__setref(H__LOCK, __lock__, syslock); \
14      __lock__ ; \
15    } )
16
17 #define lock(__lock__) sys__lock(h__deref(H__LOCK, __lock__))
18 #define unlock(__lock__) sys__unlock(h__deref(H__LOCK, __lock__))
19 #define testlock(__lock__)
   sys__testlock(h__deref(H__LOCK,__lock__))
20
21 #define deletelock(__lock__) \
22    ( { \
23      sys__freelock(deref(H__LOCK, __lock__)); \
24      h__reset(__lock__); \
25    } )
26
27 #endif
```

EXAMPLE 3

Substitute lock.h Program Resource Include File for a Target Computing Environment of the Program Source Code of Example 1

In accordance with an aspect of the present invention, transparent rewriting of the existing program code in this way includes the replacement of a locally-defined resource with a token which can be used subsequently to redirect an operation on the locally-defined resource to an appropriate resource of the target system.

In accordance with an aspect of the invention, the handle_ct data type referenced in Example 3 is constructed in such a way that the target computing environment can detect damage to an instance of the handle_ct data type, including a failure to initialize. One of ordinary skill in the art would readily recognize that there are several known mechanisms for establishing integrity of an instance of the explicitly-declared data type (e.g. check-summing).

In the target computing environment, an uncontrolled resource which is remapped in accordance with the present invention is only accessible via functions of the target computing environment which are defined for the purpose of accessing the resource. As shown in Example 3, a function for accessing a resource controlled by a target computing environment which has replaced an uncontrolled resource is made available to the existing program code via a macro definition which redefines a service referenced by the program source code to invoke a resource management service of the target computing environment. For instance, the #define statement in line 17 of Example 3 redefines a call to the lock( ) service by the program source code to invoke the sys_lock( ) resource management service of the target computing environment. In Example 3, the resource management services of the target computing environment include the following functions: sys_initlock( ), sys_lock( ), sys_unlock( ), sys_testlock( ), and sys_freelock( ). In Example 3, the resource management services of the target computing environment are provided by the syslock.h file, which has been included in the lock.h file by the #include <syslock.h> statement.

In the target computing environment, it is no longer possible to inadvertently access or update the information represented by the remapped resource. The target computing environment can also establish mechanisms for the recovery of the remapped resource.

The content of substitute lock.h program resource include file of Example 3 for a target computing environment differs in several aspects from the lock.h file for the native computing environment. The substitute lock.h program resource include file of Example 3 references two additional program include files. File handle.h provides the declarations and definitions needed to use handle_ct in the new type definition for the lock resource. File syslock.h is used to introduce the target computing environment's functionality for operating over a lock. The function h_deref is used to translate the handle reference into a lock suitable for the target system's lock operations. In this example, the translation by the h_deref function relies upon initialization of the handle by the initlock macro. Example 4 hereinbelow illustrates one example of code which implements the h_deref function. The data type syslock_t in Example 3 is opaque to the existing program source code and need not be directly interpreted by the existing program source code. From the point of view of the existing program source code, handle_ct may also be an opaque data type.

One mechanism for indirectly accessing a resource is illustrated in Example 4.

```
1  typedef struct handle_cs {
2        long type;
3        void * object;
4        long checksum;
5  } handle_ct;
6
7  ...
8
9  #define h_deref(_type_, _obj_) \
10      ((((handle_ct *) (_obj_))->type)==(_type_)) ? \
11      (((handle_ct *) (_obj_))->object) : \
12      (NULL)
13
14 #define h_setref(_type_, _handle_, _resource_) \
15      do {((handle_ct *) (_handle_)).type = (_type_); \
16         ((handle_ct *) (_handle_)).object = (_resource_); \
17         ((handle_ct *) (_handle_)).checksum \
18              = (_type_)^(_resource_); \
19      } while (0)
20 ...
```

EXAMPLE 4 h_deref.h Include File for a Target Computing Environment

The definition of the handle_ct data type is not mandated by method of the present invention, but the definition of the handle_data type in Example 4 is one embodiment of a handle-object data type for representing a resource to be controlled by a target computing environment. In Example 4, the h_deref service is defined using a macro in conjunction with a manifest definition of the handle_ct data type. If the definition of handle_ct is to be opaque, then the h_deref service would be implemented as a function or otherwise concealed in a discrete executable component.

In connection with the replacement of a locally-defined resource with a handle, the data area containing the resource is modified so that the data type of the critical resource is consistent with the data type of the handle being used to replace the resource. This does not affect the behavior of the unchanged, migrated program code. C language preprocessing is then used to re-specify services (in the shared program source code) which intentionally reference the resource object. The change in data type of the resource's identifier and the mapping to local system services are not apparent to the unchanged, migrated program source code. Unintentional references to the handle will generally produce an error at compile time. Other unintentional damage to the handle will be detected by the local computing environment the next time the resource is used. Damage to an unused resource is avoided because the resource is no longer directly accessible to the existing program code.

Figure 2:
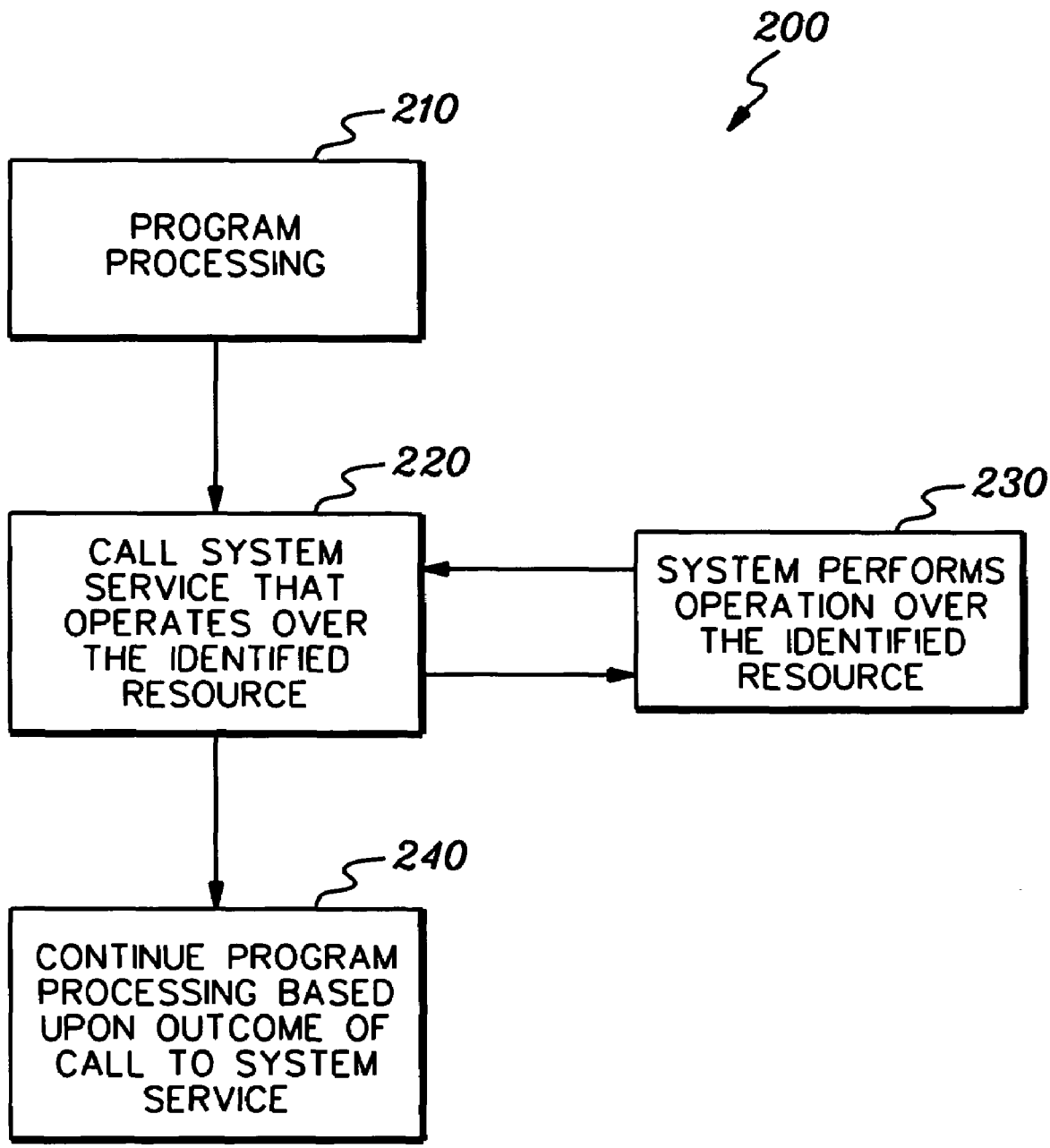
FIG. 2 illustrates a flow diagram of one example of processing of existing program code which accesses a resource.

FIG. 2 illustrates flow diagram 200 for one example of the processing executed by existing program code which accesses a resource. The processing of flow diagram 200 includes processing by existing program code 210. The existing program code then calls a system service to perform an operation over an identified resource 220. The operating system performs the requested operation over the resource identified in the system service call 230 and returns to the existing program code. The processing of the existing program code continues based upon the outcome of the call to the system service 240.

Figure 3:
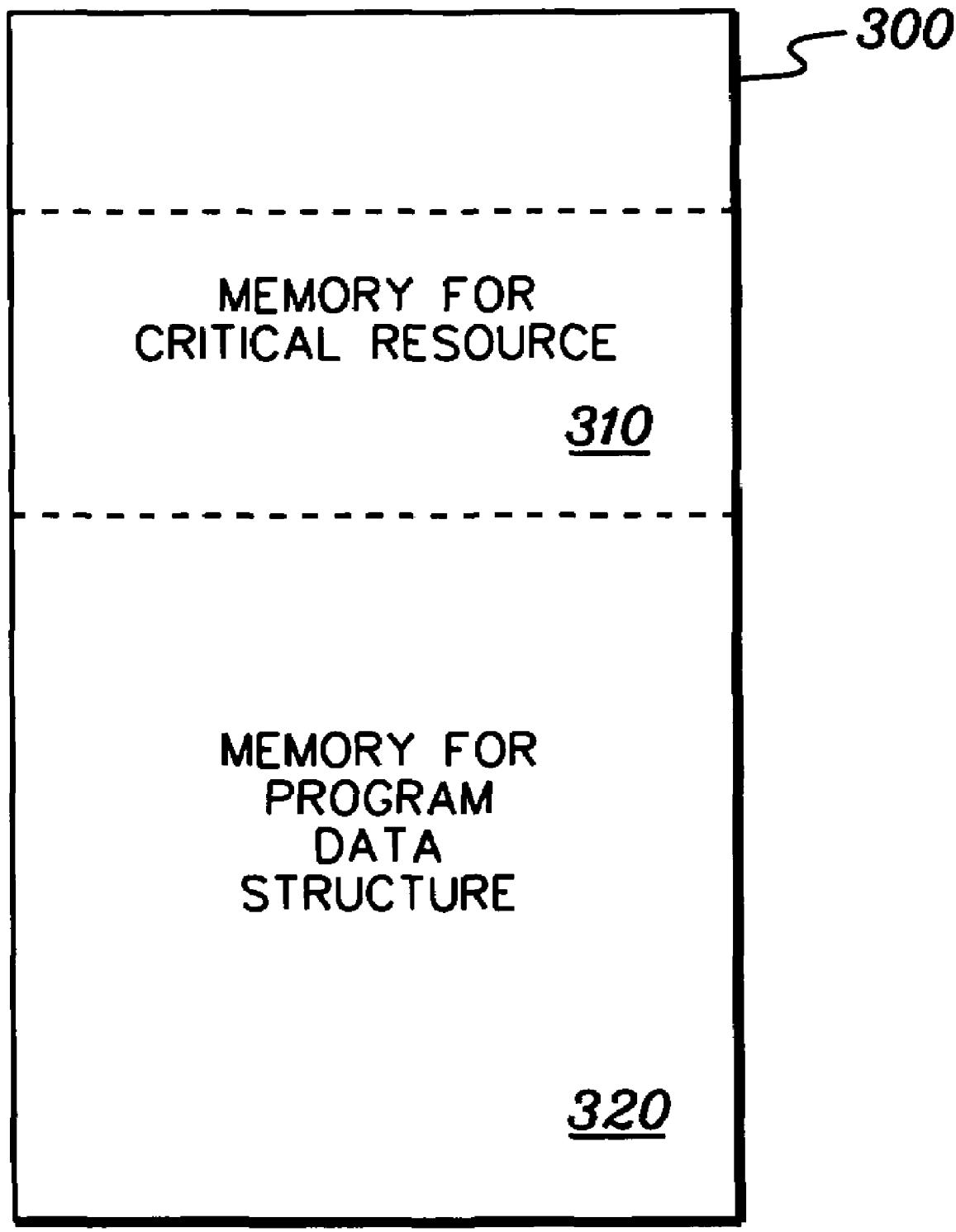
FIG. 3 illustrates one example of an organization of memory utilized by existing program code in a computing environment.

Existing program code may have direct access to a critical resource of the computing environment because the critical resource may be stored in a memory location which is directly accessible to the existing program code. FIG. 3 illustrates one example of an organization of memory utilized by existing program code in a computing environment. In the example illustrated in FIG. 3, memory for the critical resource 310 is embedded in program memory space 300, which is utilized by existing program code during execution in a computing environment. In the example of FIG. 3, memory for the critical resource 310 is located adjacent to memory for program data structures 320 in program memory space 300.

Memory for the critical resource 310 stores data components which are recognized as being critical to the reliability, availability, and serviceability of the computing environment in which the existing program code runs, for example. In accordance with an aspect of the present invention, the existing program code is aware of the location and size of memory for the critical resource 310, but the existing program code is not able to directly interpret or operate upon the data stored therein. Although memory for the critical resource 310 is located in program memory space 300 in the example illustrated in FIG. 3, this is not required. Memory for the critical resource 310 could be located in memory space of memory 104 in FIG. 1 which is specifically allocated for storing critical resources, for example. Because a data structure of the existing program code can be dynamically allocated in any memory location within the existing program code's program memory space 300, the example of FIG. 3 illustrates that a critical resource which is stored within the program memory space is exposed to the risk of inadvertent damage from being overwritten.

Figure 4:
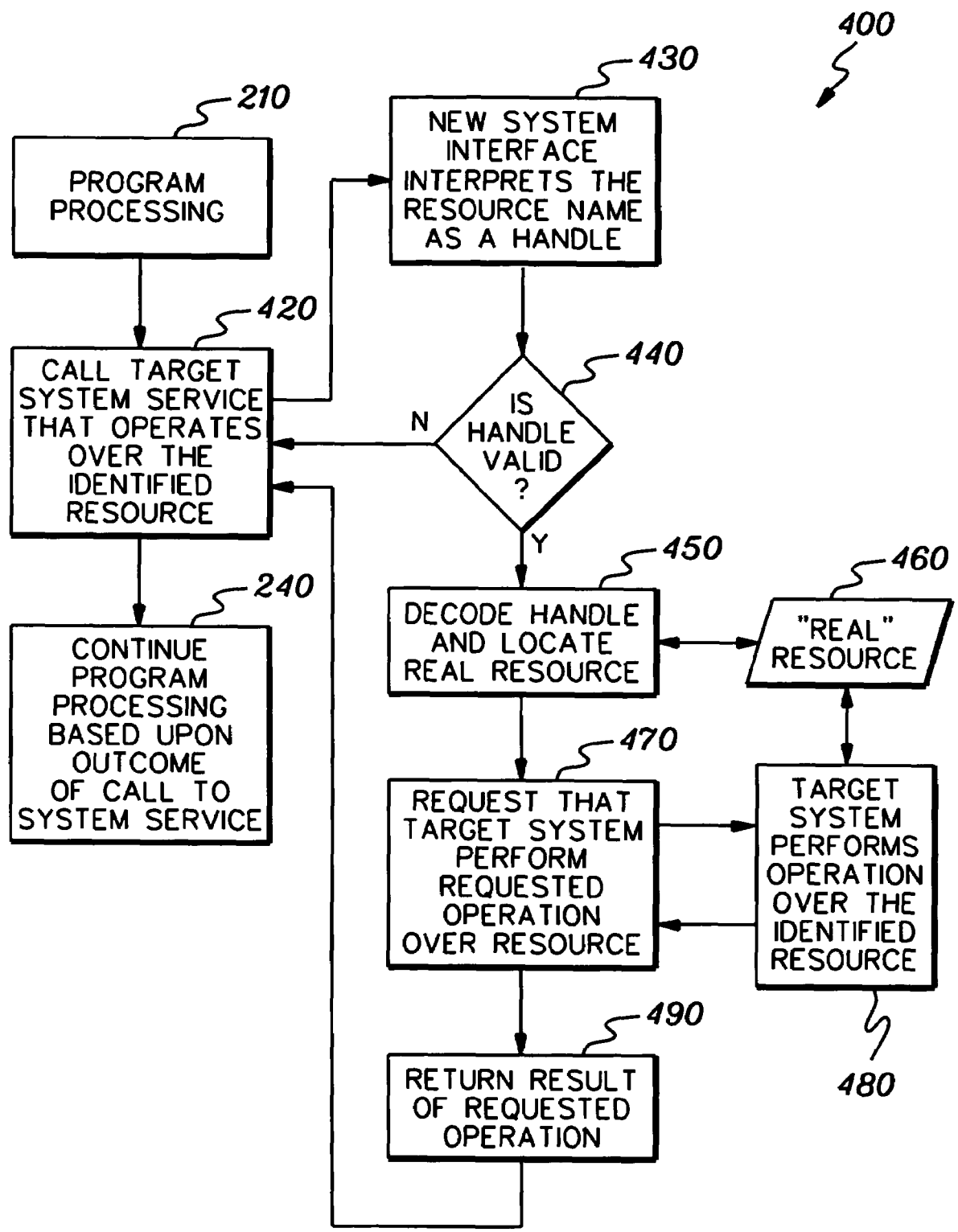
FIG. 4 illustrates one example of a flow diagram of program code processing which results from incorporating a facility for computing-environment control of a resource to be accessed, in accordance with an aspect of the present invention.

FIG. 4 illustrates one example of a flow diagram 400 for program code processing which results from incorporating a facility for computing-environment control of a resource to be accessed by existing program code, in accordance with an aspect of the present invention. The processing of flow diagram 400 includes the same processing by existing program code 210 shown in FIG. 2. The existing program code then calls a target system service to perform an operation over an identified resource 420. A new system interface of the target system service interprets the identified resource as the name of a handle for the identified resource 430. The handle passed by the existing program code in the target system service call is tested for validity 440. If the handle representing the identified resource is not valid, processing returns to the unchanged existing program code 440; otherwise, if the handle is valid, processing continues with decoding the handle and locating the resource corresponding to the handle 450.

After retrieving the resource corresponding to the handle 460, the processing continues with a request for the target computing environment to perform a requested operation over the resource identified by the handle 470. The target computing environment performs the requested operation over the identified resource 480 and returns to the existing program code. The service of the target computing environment, which was invoked by the call to operate over the identified resource 420, returns the result of the requested operation 490. Then, the processing of the existing program code continues based upon the outcome of the call to the system service 240.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of providing target computing environment control of a resource to be accessed by existing, native program code, the method comprising:

transparently replacing an uncontrolled resource within memory space directly accessible by an existing, native program code with a handle within the memory space directly accessible by the existing, native program code, the handle representing a resource controlled by a target computing environment and comprising a token which when accessed redirects an operation of the existing, native program code to the resource controlled by the target computing environment, the uncontrolled resource being uncontrolled by the target computing environment, and the resource controlled by the target computing environment being in memory space which is inaccessible directly by the existing, native program code, the target computing environment comprising a target operating, system which is different from a native operating system of a native computing environment for which the existing, native program code was written;

transparently interposing at least one resource management service of the target computing environment between the existing, native program code and the resource controlled by the target computing environment, wherein the at least one resource management service provides target computing environment control over the resource; and wherein the transparently replacing comprises mapping an identifier of the uncontrolled resource in the existing, native program code to the handle representing the resource controlled by the target computing environment, and wherein the target computing environment shares access to the resource controlled by the target computing environment with the existing, native program code through the handle within the memory space directly accessible by the existing, native program code.

2. The method of claim 1, wherein the at least one resource management service interprets the handle to facilitate accessing the resource.

3. The method of claim 1, wherein the at least one resource management service checks current validity of the handle.

4. The method of claim 1, wherein:

the existing native, program code comprises program source code and at least one program resource include file referenced by the program source code; and the transparently replacing comprises substituting at least one new program resource include file for the at least one program resource include file.

5. The method of claim 1, wherein:

the existing native, program code comprises program source code and at least one program resource include file referenced by the program source code; and the transparently interposing comprises substituting at least one new program resource include file for the at least one program resource include file.

6. The method of claim 1, wherein:

the existing native, program code comprises program source code and at least one program resource include file referenced by the program source code; and the method further comprises substituting at least one new program resource include file for the at least one program resource include file to effect the transparently replacing and the transparently interposing.

7. The method of claim 6, wherein the method further comprises automated pre-compilation processing of the program source code and the at least one new program resource include file to effect the transparently replacing and the transparently interposing.

* * * * *

UNITED STATES PATENT AND TRADEMARK OFFICE
CERTIFICATE OF CORRECTION

PATENT NO. : 7,584,459 B2 Page 1 of 1
APPLICATION NO. : 11/035616
DATED : September 1, 2009
INVENTOR(S) : Bonsteel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this

Fourteenth Day of September, 2010

David J. Kappos
*Director of the United States Patent and Trademark Office*